United States Patent [19]
Parker, Sr.

[11] 3,914,115
[45] *Oct. 21, 1975

[54] METHOD AND APPARATUS FOR SEPARATING AND COLLECTING HYDROCARBONS IN A VOLATILE VAPOR MIXTURE

[75] Inventor: George Parker, Sr., Corpus Christi, Tex.

[73] Assignees: J. B. Trimble; Dwain Smith, both of Corpus Christi, Tex. ; part interest to each

[ * ] Notice: The portion of the term of this patent subsequent to Dec. 18, 1990, has been disclaimed.

[22] Filed: June 3, 1974

[21] Appl. No.: 475,519

Related U.S. Application Data

[63] Continuation of Ser. No. 404,232, Oct. 9, 1973, abandoned.

[52] U.S. Cl. ............................................. 55/32; 55/88
[51] Int. Cl.² .................................... B01D 53/14
[58] Field of Search .................... 55/29–32, 88, 55/171–177; 62/17, 99, 430

[56] References Cited
UNITED STATES PATENTS

| | | | |
|---|---|---|---|
| 3,182,434 | 5/1965 | Fryar | 55/32 |
| 3,403,522 | 10/1968 | Henry | 55/31 |
| 3,589,104 | 6/1971 | Panzarella | 55/32 |
| 3,648,436 | 3/1972 | Schonewald et al. | 55/88 |
| 3,770,622 | 11/1973 | Friereich et al. | 55/68 |
| 3,778,968 | 12/1973 | Parker | 55/32 |

*Primary Examiner*—Charles N. Hart
*Attorney, Agent, or Firm*—Pravel & Wilson

[57] ABSTRACT

A new and improved method and apparatus for controlling air pollution caused by volatile emissions from petroleum storage tanks and the like, wherein such volatile emissions or vapors are caused to flow in direct contact with a finely dispersed mist or spray of brine or glycol solution for condensing the hydrocarbon vapors, and for also collecting water vapor in condensed form below the area in which the hydrocarbon is condensed with the brine or glycol solution, while allowing the air to pass from the vapors substantially free of pollutants.

9 Claims, 2 Drawing Figures

3,914,115

METHOD AND APPARATUS FOR SEPARATING AND COLLECTING HYDROCARBONS IN A VOLATILE VAPOR MIXTURE

CROSS-REFERENCE TO RELATED APPLICATION

This application is a continuation of co-pending U.S. application Ser. No. 404,232 filed Oct. 9, 1973 and now abandoned.

BACKGROUND OF THE INVENTION

The field of this invention is methods and apparatus for separating petroleum hydrocarbons from a vapor of petroleum hydrocarbons, water and air for controlling air pollution.

In the storage of petroleum in large storage tanks, vapors are expelled due to changing temperatures of the atmosphere surrounding the storage tanks and the vapors are also displaced when the tank is filled. In the past, it has been customary to provide a floating roof in each storage tank so that the amount of vapors were reduced. Such floating roof construction has been very expensive, and with older tanks, such construction has been generally impossible since they are usually out of round and/or they have steel framing which interferes with an adequate seal between the floating roof and the side wall of the tank.

In other instances, vapor recovery has been effected from storage tanks by passing the hydrocarbon vapors through a carbon bed, then regenerating the bed and cooling it down for re-use. Such vapor recovery system is also very expensive and as a consequence is not extensively used. Refrigeration heat exchange has also been employed for vapor recovery, but it suffers from the disadvantage that the water which is usually present with the hydrocarbon vapors freezes in the heat exchanger tubes, causing heat transfer and flow problems.

In addition to the prior art cited in U.S. application Ser. No. 279,499, examples of other prior art known to the applicant are U.S. Pat. Nos. 2,007,019; 2,753,691; 2,885,109; 2,889,013; 2.929,463; 3,124,937; 3,581,782; 3,648,436; and 3,661,366, and British Patent No. 893,642, most of which have only limited relevancy, if any. The Schlict U.S. Pat. No. 2,077,019 discloses the use of a brine for controlling the back pressure in a petroleum storage tank, but there is no control of the temperature of the brine, and further, such system is dangerous in that if water is present in the vapors passing through the pipe in the brine, and the brine is at or below freezing, ice may form in the pipe and plug off the flow, thus exposing the system to an explosion as the pressures develop.

SUMMARY OF THE INVENTION

The present invention relates to new and improved methods and apparatus for controlling air pollution caused by volatile emissions of petroleum hydrocarbons, air and water vapor. The vapors are caused to flow upwardly through a tower in which a brine or glycol solution is sprayed or otherwise finely dispersed for direct contact with the hydrocarbon and water therewith in vapor form. The hydrocarbon and water vapors are condensed by the cold brine or glycol solution and are collected in a reservoir below the tower, while the air in relatively unpolluted form is permitted to discharge to the atmosphere.

DESCRIPTION OF THE PREFERRED EMBODIMENT

Figure 1:
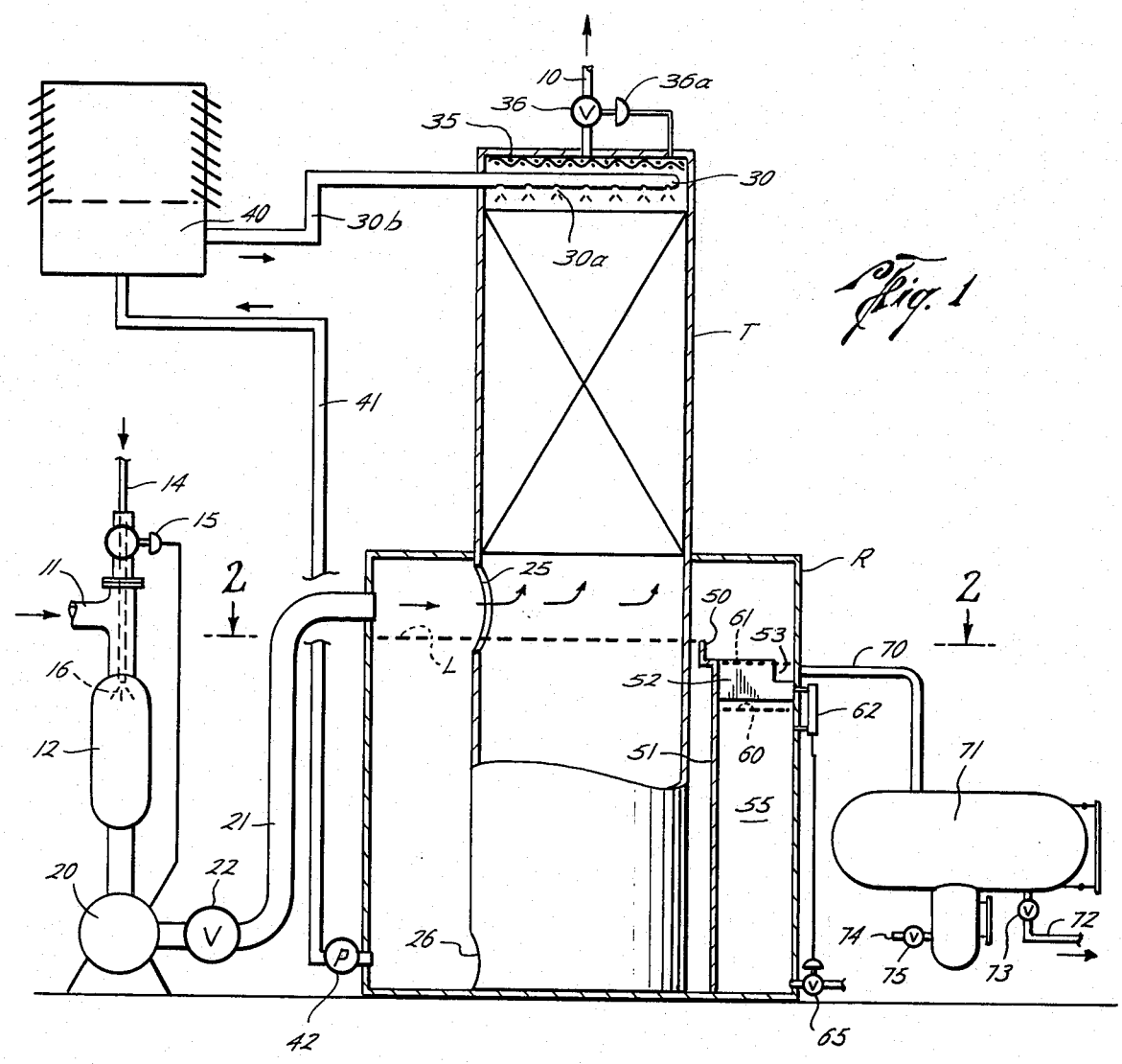
FIG. 1 is a view, partly in section and partly schematic, of the apparatus of this invention used for carrying out the method of this invention.

Various petroleum products such as gasoline and other petroleum products are conventionally stored in extremely large storage tanks which may be several hundred feet in diameter and of a height equivalent to a multiple story building. Because of the size of such a storage tanks, variations in the ambient temperature to which such tanks are exposed create pressure variations resulting in uncontrolled vapor emissions. The apparatus and method of this invention provide for almost complete recovery of the hydrocarbons in the petroleum vapors so as to control air pollution which might otherwise result if such volatile petroleum emissions escape from the storage tanks into the atmosphere. Briefly, the hydrocarbon in the petroleum vapors are condensed in a tower T by directing the vapors upwardly therethrough in direct contact with a cold brine or glycol solution which is preferably introduced as a spray for fine dispersion throughout the tower T. The water in the vapors from the storage tank or the like goes into solution with the brine or glycol at the same time that the hydrocarbon is condensed by such brine or glycol and both are collected in a reservoir or tank R disposed below the tower T. Any air which is with the petroleum vapors initially passes out into the atmosphere in substantially uncontaminated form through an outlet pipe 10 at the upper end of the tower T. The hydrocarbons which are condensed may be recovered for their value.

Considering the invention more in detail, the volatile emissions or vapors from the storage tanks or other source is directed through any suitable pipe (not shown) to the inlet pipe 11 and such vapors are then saturated in a saturator unit 12 by introducing hydrocarbons into such a saturator unit 12 through an inlet line 14.

As will be more evident hereinafter, the hydrocarbons which are used for the saturation of the vapors with the hydrocarbons in the saturator unit 12 may be those recovered from the system itself, and preferably a motor-controlled valve 15 is utilized for controlling the admission of the hydrocarbon liquid so that it is sprayed into the saturator 12 as indicated at 16 only when a blower 20 is operating. The blower 20 is a low pressure blower that has a maximum pressure developed of 10 pounds per square inch gauge (psig). It is important that the gases are not compressed to any high pressure since that causes the danger of explosions. It is also to be noted that the saturator saturates the vapors above the upper explosive limit so that the danger of exploding the vapors during the processing with the apparatus of this invention is prevented.

The blower 20 is connected to a flow line 21 which preferably has a control valve 22 therein. The flow line 21 leads to, and directs the vapors to, the upper end of the reservoir or tank R at a point above the liquid level L of the liquid in the reservoir R.

The tower T may be constructed in numerous ways, but as illustrated in FIG. 1 of the drawings, the tower T extends down into the reservoir R and it has at least one opening 25 through the wall thereof above the liquid level L for the flow of the vapors from the upper portion of the reservoir R into the lower portion of the tower T. The opening 25 also preferably extends downwardly so that it is below the upper liquid level L, and a similar opening or openings at 26 are provided near the lower portion of the tower T so that the liquid in the reservoir R may circulate from the lower portion of the tower T to the rest of the reservoir R, as will be more evident hereinafter.

The tower T is a packed tower which has Raschig rings or Pall rings therein and supported in any conventional manner so that the vapors may flow upwardly therethrough and so that a brine or glycol solution which is sprayed into the upper portion of the tower T through a spray bar 30 is dispersed and directly contacts the hydrocarbon, water and air vapors passing upwardly through the tower T. As illustrated in FIG. 1, the brine or glycol solution is sprayed through a plurality of outlet openings 30a which are disposed across the top of the tower T and the lower portion of the spray header or tube 30. Other suitable means for spraying the cold brine or glycol solution into the tower T may be utilized.

A mist eliminator 35 which is preferably a screen of fine mesh wire is provided at the very top of the tower T, above the spray header or tube 30 so that any mist which tends to pass upwardly is condensed or coalesced so that it falls back into the tower T rather than going out through the outlet opening or tube 10 with the air that is discharged therethrough. A valve 36 is provided in the discharge tube 10 and it has a back pressure control 36a therewith of conventional construction which is adapted to open when the pressure in the tower T exceeds a preset amount, such as 10 psig.

The cold brine or glycol solution is introduced into the header 30 through a tube 30b which extends to a chiller or refrigeration unit 40 where the brine or glycol is cooled to a temperature which is broadly within the range of about −20°F. to about 40°F. The brine or glycol is fed to the chiller 40 through a flow line 41 by means of a pump 42 or other suitable means which is connected to the reservoir R.

The level of the brine or glycol liquid in the reservoir R is controlled by an overflow weir 50 which is disposed at the upper end of a dividing wall 51 in the reservoir R. The dividing wall 51 extends across the full width of the reservoir R and there is a portion 50a of the weir which is cut away at one side of the wall 51 (FIG. 2) so that all of the flow of the liquid from the main portion of the reservoir is directed across the wall 51 at such weir opening 50a. A series of baffles 52 and 53 which are connected to the plate 51 and to the inside wall of the reservoir R, respectively, are disposed so as to cause the flow of the liquid in the decanter section 55 of the reservoir R to follow a circuitous pattern which causes increased settling and separation time, whereby the gasoline or other hydrocarbons are more certain of being completely separated from the brine or glycol. Since the brine or glycol is heavier than the hydrocarbons, a liquid interface 60 is at the upper level of the brine or glycol solution, and the gasoline or hydrocarbon upper surface level is shown at 61. A liquid level controller 62 of any conventional construction is mounted on the side of the reservoir R adjacent the decanter section 55 so as to control an outlet valve 65 which discharges brine as necessary to maintain the liquid level interface 60 at a predetermined height. The overflow of the gasoline or other hydrocarbons which have been separated occurs from the decanter section 55 through an outlet tube 70 which flows into a receiver 71 where the recovered hydrocarbon is collected. The recovered hydrocarbon from the receiver 71 may be caused to flow for further processing through a discharge line 72 which is controlled by a valve 73 therewith. Also, a flow line 74 having a valve 75 for controlling the flow therethrough may be connected to the lower end of the receiver 71 and it may be directed to the inlet pipe 14 by any suitable piping (not shown) so that the recovered hydrocarbon is thus utilized, at least in part, for saturating the incoming vapors in the saturator 12, as previously explained.

The main portion of the reservoir R which is to the left of the wall 51 (as viewed in FIGS. 1 and 2) is large enough to provide a heat sink so that during idle periods, or periods of low volume flow of the vapors, the temperature of the solution may become colder, and then when there are surges in the throughput of the vapors, the temperature of the solution may increase but still be within the range in the tower for satisfactory condensation of the hydrocarbons. Also, although the broad temperature range for the brine or glycol solution is as stated above, the preferred temperature for the brine or glycol solution which enters through the header 30 is about 20°F.

Figure 2:
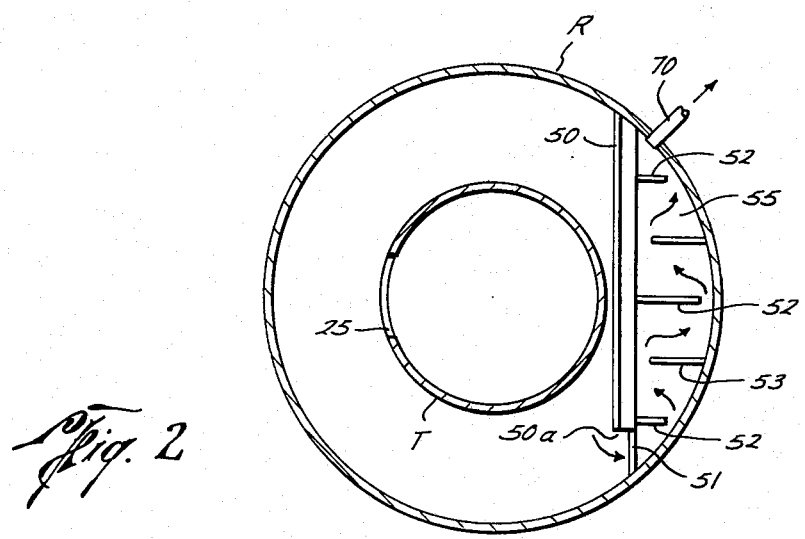
FIG. 2 is a cross-sectional view taken on line 2—2 of FIG. 1.

In carrying out the method of this invention, using the apparatus of FIGS. 1 and 2, the volatile emissions of petroleum vapors, water and air are passed from a storage tank (not shown) to the inlet pipe or line 11 and are then saturated with hydrocarbons to prevent them from becoming explosive during the processing. The hydrocarbons which may be treated by the present process are hydrocarbons such as propane, butane, pentane and heavier, and they are normally present with water and air.

The vapors thus introduced through the line 11 are caused to flow through the line 21 by means of the low pressure blower 20 so that the vapors then enter the reservoir R above the liquid level L of the brine or glycol solution and flow upwardly through the tower T while the cold brine or glycol solution is sprayed or is otherwise dispersed and flows countercurrently downwardly, causing the hydrocarbon vapors to condense and also causing any water which is present to condense and fall downwardly as liquid into the reservoir R to the left of the baffle plate 51 as viewed in FIG. 1.

The liquid in the reservoir R to the left of the baffle 51 flows through the weir opening 50a and into the decanter section 55 where the baffle arrangement is such that ample time is provided for a maximum separation of the hydrocarbons above the brine or glycol solution, the level of which is controlled by the liquid level controller 62. The liquid hydrocarbons are received and collected in the receiver 71 for further processing through the line 72 and for use in part by flowing from the line 74 to the line 14 for use in the saturator 12 as previously explained.

Because water is brought into the glycol or brine solution with the petroleum hydrocarbons that are condensed, the solution is constantly being diluted and, therefore, the brine or glycol solution is regenerated by heating same to boil off some of the water, or by otherwise removing some of the water, in any manner known to those skilled in the art. Make-up brine or glycol solution is also added as desired to compensate for any of the solution which is lost in the process by vaporization or otherwise.

The glycol solution may, by way of example, be an 80% propylene glycol (by volume) solution with the other 20% (by volume) being water. With such a glycol solution, the temperature would be maintained between about 10°F. and about 15°F. to recover about 95 percent of propane and heavier hydrocarbons that would normally be present in a gasoline storage tank having a gasoline blend stored therein.

The solution may also be an 80% ethylene glycol solution, with the other 20% being water and under such circumstances, butane and heavier hydrocarbons may be condensed and recovered up to about 90 percent or better by maintaining the glycol solution at a temperature as high as 40°F., but preferably in the neighborhood of 30°F. Thus, it can be seen that the percentage concentration of the glycol to water may be varied depending upon the temperature level desired and also the particular hydrocarbons which are being condensed and recovered. Such factors may be readily determined by those skilled in the art, using the foregoing examples for guidance.

Although the invention has been specifically described for recovering vapors from petroleum storage tanks, it should be understood that this invention is not limited to such source for petroleum vapors, since the petroleum vapors may come from any source.

The foregoing disclosure and description of the invention are illustrative and explanatory thereof, and various changes in the size, shape, and materials as well as in the details of the illustrated construction may be made without departing from the spirit of the invention.

I claim:

1. A method of controlling volatile petroleum emissions from a storage tank, comprising the steps of:
   transporting petroleum vapors together with any water and air therewith by a low pressure blower to a packed tower;
   regulating the pressure of the petroleum vapors in the storage tank by admitting air into the tank when the pressure drops below a predetermined amount related to atmospheric pressure, and by effecting said transporting of the petroleum vapors to the packed tower when the pressure in the tank exceeds a predetermined amount related to atmospheric pressure;
   precooling a solution selected from the group consisting of brine and glycols prior to flow to said tower;
   thereafter conducting said precooled solution to said tower and finely dispersing same for downward flow in said packed tower;
   cooling said petroleum vapors and water therewith in said tower solely by said finely dispersed solution;
   controlling the temperature of said solution so that it is low enough to condense a substantial portion of the hydrocarbons in said vapors;
   causing any water with said petroleum vapors to go into solution with said solution;
   separating any air from said petroleum vapors by the discharge of the air from the upper portion of said tower; and
   separating said condensed hydrocarbons from said solution.

2. The method set forth in claim 1, wherein:
   the temperature of the solution is controlled by refrigerating same prior to flow in said tower.

3. The method set forth in claim 1, wherein:
   the temperature of the solution is maintained within a range from about minus 20°F. to about 40°F.

4. The method set forth in claim 1, wherein:
   said condensed hydrocarbons are separated from thee solution by decanting said condensed hydrocarbons.

5. The method set forth in claim 1, including:
   regenerating the solution after it has been diluted with the water introduced with the petroleum vapors so as to maintain the strength of the solution at an adequate level for the condensation and recovery of the hydrocarbons therein.

6. An apparatus for controlling volatile petroleum emissions from a storage tank, comprising:
   a storage tank;
   a low pressure blower means for transporting petroleum vapors together with any water and air therewith to a packed tower having means therein for finely dispersing a solution selected from the group consisting of brine and glycols;
   means for regulating the pressure of the petroleum vapors in the storage tank by admitting air into the tank when the pressure drops below a predetermined amount related to atmospheric pressure; and
   means for effecting transporting of the petroleum vapors to the packed tower when the pressure in the tank exceeds a predetermined amount related to atmospheric pressure;
   precooling means separate from said tower for cooling said solution;
   said means for finely dispersing the solution providing the sole means for cooling the petroleum vapors in said tower;
   means for supplying the solution to the upper portion of the tower;
   means for finely dispersing the solution and flowing it downwardly in the tower;
   means for flowing said petroleum vapors together with any water and air therewith upwardly through and in direct contact with said finely dispersed solution for condensing a substantial portion of the hydrocarbons in the petroleum vapors, allowing the water therewith to go into solution, and separating the air for discharge therefrom; and
   means for separating said condensed hydrocarbons from the solution.

7. The apparatus set forth in claim 6, wherein said means for finely dispersing the solution includes:
   means for spraying the solution over the petroleum vapors in a tower.

8. The apparatus set forth in claim 6, wherein said means for separating said condensed hydrocarbons includes:
   means for overflowing the solution and condensed hydrocarbons together into a settling tank; and
   means for thereafter decanting the hydrocarbons from the solution in the settling tank.

9. The apparatus set forth in claim 6, including:
a reservoir tank below said tower for receiving the solution and the condensed hydrocarbons and water;
the volume of said tank being large enough to serve as a heat sink to compensate for surges in the heat load due to variations of vapor throughput in the apparatus.

* * * * *